United States Patent [19]

Aoki et al.

[11] Patent Number: 5,164,163

[45] Date of Patent: Nov. 17, 1992

[54] HYDROCARBON REFORMING APPARATUS

[75] Inventors: Mamoru Aoki, Kobe; Yohiaki Imoto, Takasago; Hideki Sugimura, Kakogawa; Keiichi Otani, Kobe, all of Japan

[73] Assignee: Kabushiki Kaisha Kobe Seiko Sho, Kobe, Japan

[21] Appl. No.: 406,279

[22] Filed: Sep. 12, 1989

[30] Foreign Application Priority Data

Sep. 19, 1988 [JP] Japan .................. 63-234486
Nov. 22, 1988 [JP] Japan .................. 63-295258

[51] Int. Cl.⁵ ............................................. B01J 8/04
[52] U.S. Cl. .................................. 422/190; 422/202; 422/211; 422/312; 48/214 A; 48/215
[58] Field of Search ............... 422/190, 193, 202, 203, 422/204, 211, 312; 48/94, 95, 214 A, 215

[56] References Cited

U.S. PATENT DOCUMENTS

| | | | |
|---|---|---|---|
| 3,144,312 | 8/1964 | Mertens | 48/215 |
| 3,541,729 | 11/1970 | Dantowitz | 48/94 |
| 4,098,589 | 7/1978 | Buswell et al. | 48/94 |
| 4,678,600 | 7/1987 | Stahl et al. | |
| 4,692,306 | 9/1987 | Minet et al. | 422/211 |
| 4,746,329 | 5/1988 | Christner et al. | 48/61 |
| 4,849,187 | 7/1989 | Uozu et al. | 48/94 |
| 4,861,348 | 8/1989 | Koyama et al. | 48/94 |
| 4,909,808 | 3/1990 | Voecks | 48/94 |

FOREIGN PATENT DOCUMENTS

| | | |
|---|---|---|
| 171786 | 2/1986 | European Pat. Off. |
| 195688 | 9/1986 | European Pat. Off. |
| 50-151790 | 12/1975 | Japan |
| 53-13412 | 5/1978 | Japan |
| 53-78992 | 7/1978 | Japan |
| 53-79766 | 7/1978 | Japan |
| 53-79768 | 7/1978 | Japan |
| 56-105745 | 8/1981 | Japan |
| 57-1482 | 1/1982 | Japan |
| 57-7538 | 2/1982 | Japan |
| 57-192489 | 11/1982 | Japan |
| 58-124530 | 7/1983 | Japan |
| 59-102801 | 6/1984 | Japan |
| 60-103001 | 6/1985 | Japan |
| 61-247601 | 11/1986 | Japan |
| 63-27972 | 6/1988 | Japan |
| 64-7119 | 2/1989 | Japan |
| 1-24533 | 5/1989 | Japan |
| 1-155940 | 6/1989 | Japan |

OTHER PUBLICATIONS

Patent Abstracts of Japan, vol. 14, No. 24 (C-677)[3967], Jan. 18, 1990; and JP-A-1 264 903 (Kobe Steel Ltd) Oct. 23, 1989.
Proceedings of the 28th Power Sources Symposium, Jun. 12-15, 1978 (The Electrochemical Society, Inc., P.O. Box 2071, Princeton, N.J., 08540), pp. 37-41, "1.5 kW Methanol Fuel Cell Power Plant System Design Study" (A. Meyer).

Primary Examiner—Robert J. Warden
Assistant Examiner—Krisanne M. Thornton
Attorney, Agent, or Firm—Oblon, Spivak, McClelland, Maier & Neustadt

[57] ABSTRACT

A hydrocarbon reforming apparatus having a furnace casing, a combustion gas passage formed in the furnace casing, a cylindrical reactor which is made up of multilayered passages arranged concentrically around the combustion gas passage, with the multilayered passages being filled with catalysts, a combustion gas discharge passage communicating with the combustion gas passage, and a feedstock gas intake passage communicating with any one of the multilayered passages, characterized in that the combustion gas discharge passage is arranged on the inside of either of the outer passage of the multilayered passages or the feedstock gas intake passage, so that the combustion gas discharge passage is separated from the furnace casing.

14 Claims, 5 Drawing Sheets

①: UPPER PART OF OUTER REACTOR
②: LOWER PART OF OUTER REACTOR
③: INLET OF BYPASS PIPE
④: LOWER PART OF INNER REACTOR
⑤: OUTLET OF UPWARD PASSAGE OF INNER REACTOR
⑥: UPPER PART OF COMBUSTION CHAMBER
⑦: LOWER PART OF COMBUSTION CHAMBER
⑧: UPPER PART OF WASTE COMBUSTION GAS DISCHARGE PASSAGE

HYDROCARBON REFORMING APPARATUS

BACKGROUND OF THE INVENTION

1. Field of the Invention

The present invention relates to an apparatus for steam reforming to convert hydrocarbons such as methane into hydrogen, ammonia, methanol, oxo gas, town gas, etc. More particularly, it is concerned with a hydrocarbon reforming apparatus which has a high thermal efficiency, is compact in size, and saves the cost of reforming catalysts.

2. Description of the Prior Art

There are several known reforming apparatuses for converting hydrocarbons (such as fuel oil, naphtha, and natural oil) into reformed gas, which is a combustible gas composed of hydrogen as a principal component and carbon monoxide, carbon dioxide, and methane by mixing the feedstock with steam and passing the mixture through a catalyst layer. They are disclosed in Japanese Patent Laid-open Nos. 78992/1978, 79766/1978, 90862/1981, and 63783/1983, and Japanese Patent Publication No. 7538/1982. They are of double-pipe structure in which the hydrocarbon feedstock for reforming is passed through a reaction tube which is filled with a catalyst and heated externally by a combustion gas from a burner. The double-pipe structure improves the thermal efficiency and makes the apparatus compact.

There is another known reforming apparatus disclosed in Japanese Patent Laid-open No. 102801/1984. It is made up of a reactor of triple-pipe structure and a combustion chamber surrounding the reactor. It is designed such that the combustion gas from the combustion chamber passes through the central tube of the reactor and the feedstock passes through the middle tube and then the outer tube in the direction opposite to that in which the combustion gas flows. While passing through the reactor, the feedstock receives the heat necessary for steam reforming which is an endothermic reaction.

The above-mentioned reforming apparatus, however, is not satisfactory in performance. It is poor in thermal efficiency as indicated by the fact that it discharges the exhaust gas at a considerably high temperature. It does not heat the reactor uniformly, nor does it utilize the heat of the combustion gas efficiently. Furthermore, it is not compact because it needs a thick insulation layer.

SUMMARY OF THE INVENTION

The present invention was completed to eliminate the above-mentioned disadvantages. Accordingly, it is an object of the present invention to provide a hydrocarbon reforming apparatus which utilizes the catalyst effectively and performs the reforming reaction efficiently. It is another object of the present invention to provide a hydrocarbon reforming apparatus which has a compact size on account of its simplified insulation structure. Another object of the present invention to provide a hydrocarbon reforming apparatus which has improved thermal efficiency (owing to the improved insulation structure) and hence has an improved reforming efficiency.

The first aspect of the present invention resides in a hydrocarbon reforming apparatus having a furnace casing, a combustion gas passage formed in the furnace casing, a cylindrical reactor which is made up of multilayered passages arranged concentrically around the combustion gas passage, with the multilayered passages being filled with catalysts, a combustion gas discharge passage communicating with the combustion gas passage, and a feedstock gas intake passage communicating with any one of the multilayered passages, characterized in that the combustion gas discharge passage is arranged on the inside of either of the outer passage of the multilayered passages or the feedstock gas intake passage, so that the combustion gas discharge passage is separated from the furnace casing.

The second aspect of the present invention resides in a hydrocarbon reforming apparatus which comprises a reaction chamber of cylindrical multilayered structure which is intended to reform hydrocarbons, a heat supply chamber of large diameter which is formed inside the reaction chamber, a heat transfer room of cylindrical structure which communicates with the heat supply chamber and is formed outside the reaction chamber, and a gas-phase heat-insulation chamber which communicates with the reaction chamber and is formed outside the heat transfer chamber.

DESCRIPTION OF THE PREFERRED EMBODIMENTS

The hydrocarbon reforming apparatus of the present invention has a reactor made up of concentric multilayered passages, a combustion gas passage adjacent to the innermost passage of the reactor, and a combustion gas discharge passage which communicates with said combustion gas passage and is adjacent to the outermost passage of the reactor. This structure causes the combustion gas to heat the reactor at the innermost layer thereof and then to pass through the combustion gas discharge passage. Therefore, this structure dispenses with the thick insulation required by the conventional reforming apparatus in which the combustion gas flows from the outside to the inside. In addition, this structure permits a feedstock intake passage to be formed on the periphery of the combustion gas discharge passage. The thus formed outer passage functions as a gas-phase insulation layer, contributing to the simplified insulation structure. In other words, the feedstock intake passage is formed around the combustion gas discharge passage whereby, the heat of the combustion gas being exhausted is insulated by the feedstock gas which is not yet preheated.

The above-mentioned structure offers an advantage that the feedstock gas enters the multilayered passages of the reactor after it has been preheated by its passage through the feedstock intake passage which is formed around the combustion gas discharge passage. This prevents the feedstock gas from being heated rapidly in the reactor and hence prevents carbon deposition.

An alternative structure in which the combustion gas discharge passage is formed between the outer passage and inner passage of the reactor, offers an advantage that the outer passage functions as a gas-phase insulation layer for the combustion gas discharge passage, thereby reducing the thermal load of the insulation layer. This leads to the effect of increased thermal efficiency, reduced thickness of the insulation layer constituting the furnace casing, increased compactness of the entire apparatus. In addition, this structure permits a large proportion of the heat of the combustion gas to be transferred to the reactor, resulting in exhaust gas that has such a low temperature that the flue can be made of general-purpose refractory material. This feature contributes to a reduction of installation cost. Moreover, supplying the sensible heat of the combustion gas to both the inner layer passage and the outer layer passage improves the efficiency of heat utilization.

Figure 3:
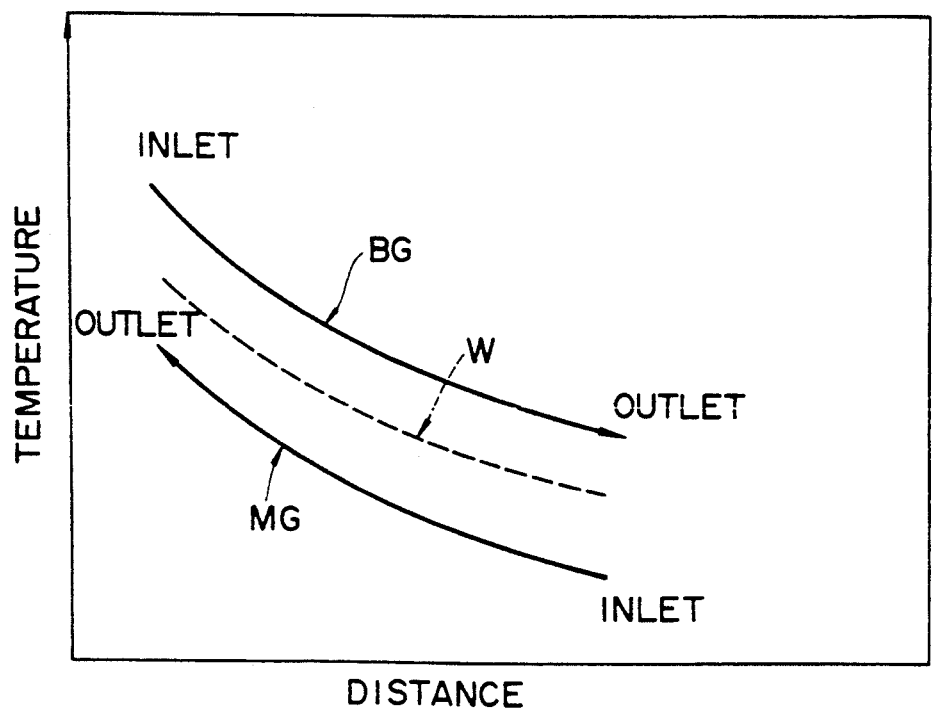

In general, there are two systems for the introduction of feedstock gas into the reactor. One is the parallel flow system in which the feedstock gas and the combustion gas flow in the same direction. In other words, the feedstock gas flows from the inner layer to the outer layer of the multilayered passages. The other system is the countercurrent flow system in which the feedstock gas and the combustion gas flow in the opposite directions. In the countercurrent flow system, the feedstock gas and combustion gas change in temperature as they flow along the passages, as shown in FIG. 3. The curve MG represents the feedstock gas and the curve BG represents the combustion gas. It is noted that the feedstock gas increases in temperature while it passes through the reactor's outer passage adjacent to the combustion gas discharge passage. However, the temperature rise in the countercurrent flow system is more gentle than that in the parallel flow system, because the gas temperature in the combustion gas discharge passage is lower than that in the combustion gas passage, as mentioned above. The feedstock gas comes into contact with the high-temperature combustion gas only when it has reached the inner passage of the reactor. Therefore, the temperature difference between the feedstock gas (or reformed gas) and the combustion gas at the feedstock gas inlet is smaller than that in the parallel flow system. This inevitably leads to a low efficiency in the utilization of the heat of the combustion gas. On the other hand, the combustion gas in the combustion gas discharge passage has a comparatively low temperature, and the reformed gas being discharged has a considerably high temperature because the outlet of the inner passage of the reactor is in contact with the combustion gas having a comparatively high temperature. This makes it necessary to install a cooler or heatexchanger to cool the reformed gas to a prescribed temperature.

Figure 2:
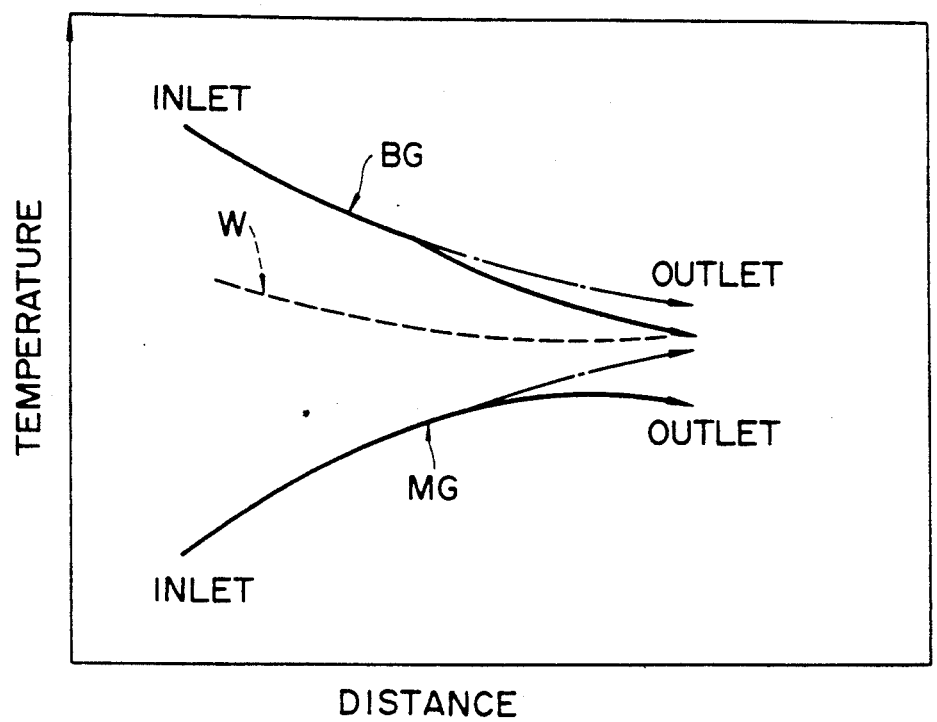
FIGS. 2 and 3 are graphs showing the temperature distribution of the combustion gas and feedstock gas in the reforming apparatuses of parallel flow type and countercurrent flow type.

In contrast, the parallel flow system in which the feedstock gas flows through the inner passage of the reactor and then through the outer passage of the reactor, the feedstock gas and combustion gas change in temperature as they flow along the passages, as shown in FIG. 2. In the parallel flow system, the feedstock gas is introduced into the inner passage which is in contact with the high-temperature region of the combustion gas passage; therefore, the temperature difference between the feedstock gas and the combustion gas at the feedstock gas inlet is considerably large. This leads to a higher efficiency in the utilization of the heat in the combustion gas than in the above-mentioned countercurrent flow system. The feedstock gas (reformed gas) which has passed through the inner passage and then the outer passage comes into contact with the combustion gas which is being discharged and has a comparatively low temperature, at the outlet of the reactor. This leads to a lower temperature of the reformed gas than in the above-mentioned countercurrent flow system. Therefore, the parallel flow system does not need a cooler or heat-exchanger to cool the reformed gas. This feature is desirable for making the apparatus compact.

Regardless of whether the parallel flow system or countercurrent flow system is employed, the reforming reaction should be carried out slowly because any abrupt reaction causes carbon deposition which is harmful to the catalyst. According to the present invention, therefore, the far upstream part of the reactor is filled with a low-activity catalyst so that the feedstock gas undergoes preheating and reforming reaction slowly there. The reactor's middle part adjacent to the far upstream part is filled with a high-activity catalyst so that the preheated feedstock gas undergoes the reforming reaction there on a full scale. The far downstream part is filled with a low-activity catalyst, in which the reforming reaction is near completion and a high-activity catalyst is not necessary any longer. Distributing catalysts of different activities to designated parts in the reactor lowers the total cost of the catalyst and prevents carbon deposition.

According to the present invention, it is desirable from the standpoint of manufacturing and thermal efficiency that the multilayered passages of the reactor, the feedstock gas intake passage, and the combustion gas discharge passage should be of concentric circular structure. However, they may also be constructed in coil form or in any other form.

For reasons mentioned above, it is desirable that the feedstock gas intake passage should be formed on and in contact with the periphery of the reactor pipe. However, in the case where a compact apparatus is preferred, it is possible that the feedstock gas be introduced directly into the multilayered passages of the reactor without being brought into contact with the periphery of the reactor.

Other features of the invention will become apparent in the course of the following descriptions of exemplary embodiments which are given for illustration of the invention and are not intended to be limiting thereof.

EXAMPLE 1

Figure 1:
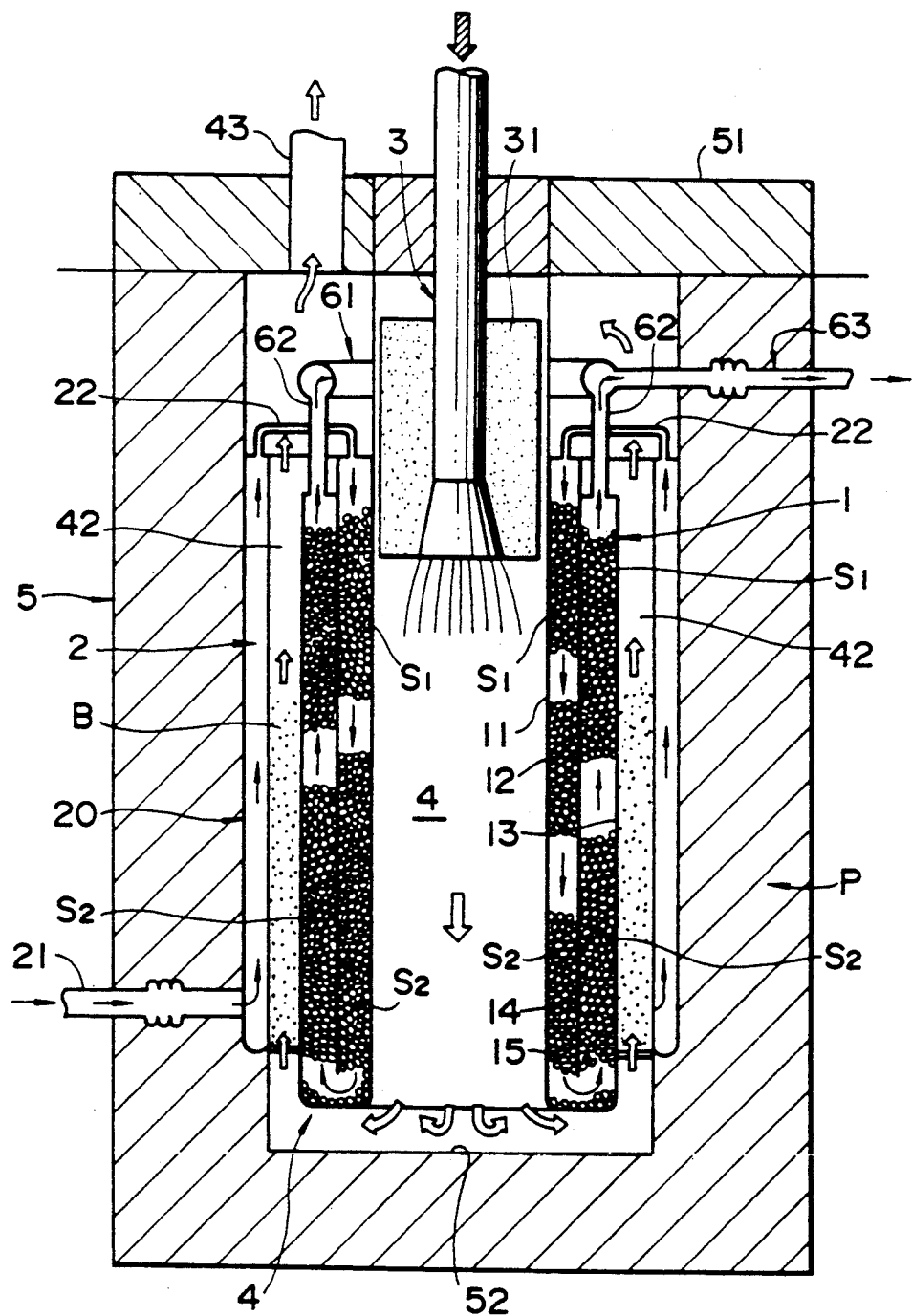
FIGS. 1, 4, and 5 are sectional views showing the embodiments of the present invention.

The first embodiment of the present invention is shown in cross-section in FIG. 1. It is a hydrocarbon reforming apparatus for fuel cells. There are shown a cylindrical reactor at 1, a feedstock intake passage at 2, a burner at 3, a combustion gas passage at 4, a furnace casing at 5, and a combustion gas discharge passage at 42.

The cylindrical reactor 1 is made up of an inner cylinder 11, a middle cylinder 12, and an outer cylinder 13, which are arranged concentrically at certain intervals. An inner passage 14 is formed between the inner cylinder 11 and the middle cylinder 12, and an outer passage 15 is formed between the middle cylinder 12 and the outer cylinder 13. The inner passage 14 and the outer passage 15 communicate with each other, with the inner cylinder 11 and the outer cylinder 13 connected to each other at their bottom and the middle cylinder 12 having its lower end a little raised. The inner passage 14 and the outer passage 15 are filled with alumina-nickel reforming catalysts $S_1$ and $S_2$, respectively. The upper end of the inner cylinder 11 is extended and fixed to the cover 51 so that the cylindrical reactor 1 is suspended in the furnace casing 5.

The feedstock intake passage 2 is formed along the inside wall of the furnace casing 5. The lower end of the feedstock intake passage 2 is connected to the inlet pipe 21 passing through the furnace casing 5. The upper end of the feedstock intake passage 2 is connected to the inner passage 14 of the cylindrical reactor 1 through a pipe 22. A manifold 61 is arranged over and concentrically with the cylindrical reactor 1. To the manifold 61 are connected branch pipes 62 coming from the outer passage 15 of the cylindrical reactor 1. The manifold 61 leads to a reformed gas outlet pipe 63 which passes through the furnace casing 5.

The central space of the cylindrical reactor 1 functions as the combustion gas passage 4. In the upper part of the central space is the burner 3 which is supported downwardly by the cover 51. The end of the burner 31 is covered with refractory tiles 31. The space between the cylindrical reactor 1 and the feedstock gas intake passage 2 functions as the combustion gas discharge passage 42, which communicates with the combustion gas passage 4 at its lower part. The intermediate part of the combustion gas discharge passage 42 is filled with alumina balls B or Raschig rings B, so that the combustion gas has an extended residence time and performs efficient heat transfer. The upper end of the combustion gas discharge passage 42 communicates with the combustion gas exhaust pipe 43 passing through the cover 51. Incidentally, the furnace casing 5 and the cover 51 are made of a heat insulating material.

The reforming apparatus constructed as mentioned above is operated in the following manner. A fuel (such as methane) and air are fed to the burner 3 to generate a high-temperature combustion gas. The combustion gas flows downward through the combustion gas passage 4 which is at the center of the apparatus. It turns around the lower end of the cylindrical reactor 1 and then flows upward through the combustion gas discharge passage 42, leaving the combustion gas exhaust pipe 43.

On the other hand, a feedstock gas composed of gaseous hydrocarbons (such as natural gas) and steam is fed through the feedstock gas intake passage 2. It flows through the pipe 22 and then flows downward through the inner passage 14 of the cylindrical reactor 1. It turns around the lower part and flows upward through the outer passage 15. The feedstock gas receives heat and undergoes reforming reaction (yielding a reformed gas composed mainly of hydrogen and carbon monoxide) while it passes through the catalyst layers in the inner passage 14 and the outer passage 15. The reformed gas enters the manifold 61 through the branch pipe 62 from the upper end of the outer passage 15. It finally leaves the reformed gas outlet pipe 63. Incidentally, the feedstock gas receives heat from the combustion gas passage 4 and the combustion gas discharge passage 42 by radiation and conduction through the filler.

In this embodiment, the feedstock gas and the combustion gas flow in parallel directions, as will be understood from the above explanation and FIG. 1. Therefore, there is a big difference in temperature between the two gases at the feedstock gas inlet, as shown in FIG. 2. This leads to a high efficiency of heat utilization. In addition, the high-temperature combustion gas produced immediately after combustion provides heat which increases the activity of the catalyst layer. This leads to an improved reforming efficiency per unit volume of catalyst. As a result, the reactor in this embodiment can be run with a lesser amount of catalyst than the conventional one, and hence it can be compact in size. The apparatus as shown in FIG. 1 can generate several thousand cubic meters of hydrogen per hour.

The reforming apparatus in this example has another advantage. The upper part of the inner passage 14 of the cylindrical reactor 1 is filled with a low-activity catalyst $S_1$, so that the feedstock gas undergoes sufficient preheating and slow reforming reaction there. And the remaining part of the inner passage 14 is filled with a high-activity catalyst $S_2$, so that the feedstock gas undergoes reforming reaction on a full scale there. The feedstock gas which has already undergone a partial reforming reaction is not subject to the abrupt reaction which causes carbon deposition. The layer of the low-activity catalyst should preferably be 100-300 mm long to avoid a rapid temperature change and to permit sufficient preheating of the feedstock gas.

The reforming apparatus in this example has another advantage resulting from the fact that the combustion gas and the feedstock gas flow in parallel directions. In other words, the feedstock gas which has not yet received heat from the combustion gas flows through the upper part of the inner passage 14 which is adjacent to the fresh combustion gas. Therefore, the wall of the inner cylinder 11 is cooled, so that the wall of the cylindrical reactor 1 has the temperature distribution as indicated by the broken line (W) in FIG. 2. That is, the wall temperature (W) is lower than that in the reforming apparatus of countercurrent flow type mentioned later. This suggests that the cylindrical reactor 1 can be made of a low-grade material to reduce the installation cost.

The reforming apparatus in this example has another feature in that the feedstock gas in the feedstock gas intake passage 2 is preheated by heat exchange with the combustion gas in the combustion gas discharge passage 42 and the combustion gas is cooled as a result of this heat exchange. In other words, the temperature of the combustion gas is lower than in the case where the feedstock gas is introduced directly into the cylindrical reactor 1 instead of being introduced through the feedstock gas intake passage. As a result, the temperature of the reformed gas is low at the exit of the outer passage 15.

The most important advantage of the reforming apparatus in this example is that the insulation (P) of the furnace casing 5 can be made thin for reasons that follow. The combustion gas discharge passage 4 on the periphery of the cylindrical reactor passes combustion gas having a lower temperature than the fresh combustion gas emerging from the burner, and the combustion gas discharge passage 42 is surrounded by the feedstock gas intake passage 2, which functions as an insulation layer. This structure greatly reduces the thermal load applied to the furnace casing compared with the conventional one. Thus, the thickness of the insulation material, which is necessary to keep the outside of the furnace casing below 60° C. for safety, can be reduced to about one-half to two-thirds of that where the combustion gas discharge passage is not surrounded by the gas intake passage 2. The thinner the insulation material, the more compact the reforming apparatus.

In the meantime, the filler (B) in the combustion gas discharge passage 4 varies the residence time of the combustion gas and hence adjusts the degree of heat exchange depending on its amount and kind. However, the filler (B) is not essential.

The above-mentioned reforming apparatus may be modified such that the feedstock gas inlet pipe 21 is connected directly to the inner layer 14. In this case, the apparatus would be made much more compact.

EXAMPLE 2

Figure 4:
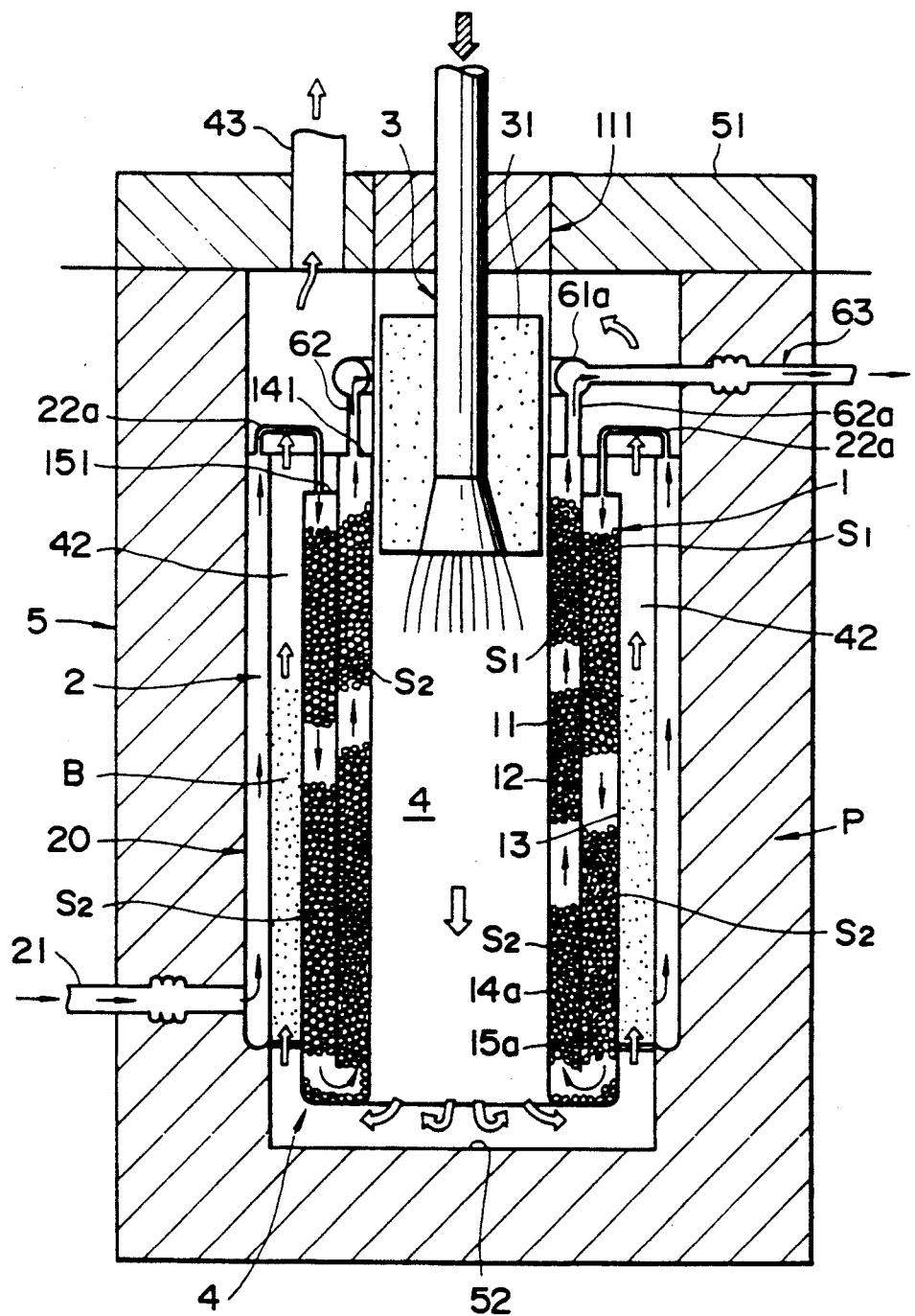

The second embodiment of the present invention is shown in section in FIG. 4. It is of the countercurrent flow type, with the feedstock gas and the combustion gas flowing in opposite directions. The apparatus shown in FIG. 4 is similar in structure to that shown in FIG. 1. The upper end of the feedstock gas intake passage 2 is connected to the outer passage 15a of the cylindrical reactor 1 via the pipe 22a, and the manifold 61a is connected to the upper end of the inner passage 14a via the branch pipes 62a. Therefore, the feedstock gas fed from the feedstock gas intake passage flows downward through the outer passage 15a adjacent to the combustion gas discharge passage 14, and it turns around the lower part and flows upward through the inner passage 14a. As a result, the feedstock gas (or reformed gas) flows in the direction opposite to that in which the combustion gas flows.

The reforming apparatus in this example produces the fundamental effect of the present invention. In other words, the thickness of the insulation material (P) can be reduced to a great extent because the combustion gas having a comparatively low temperature flows outside the cylindrical reactor and the combustion gas is insulated by the feedstock gas flowing along the outside of the combustion gas.

Incidentally, the reforming apparatuses shown in FIGS. 1 and 4 may be used in any position—vertical, horizontal, inclined, or inverted. In addition, the combustion gas passage at the center may be filled with an alumina-based combustion catalyst.

EXAMPLE 3

Figure 5:
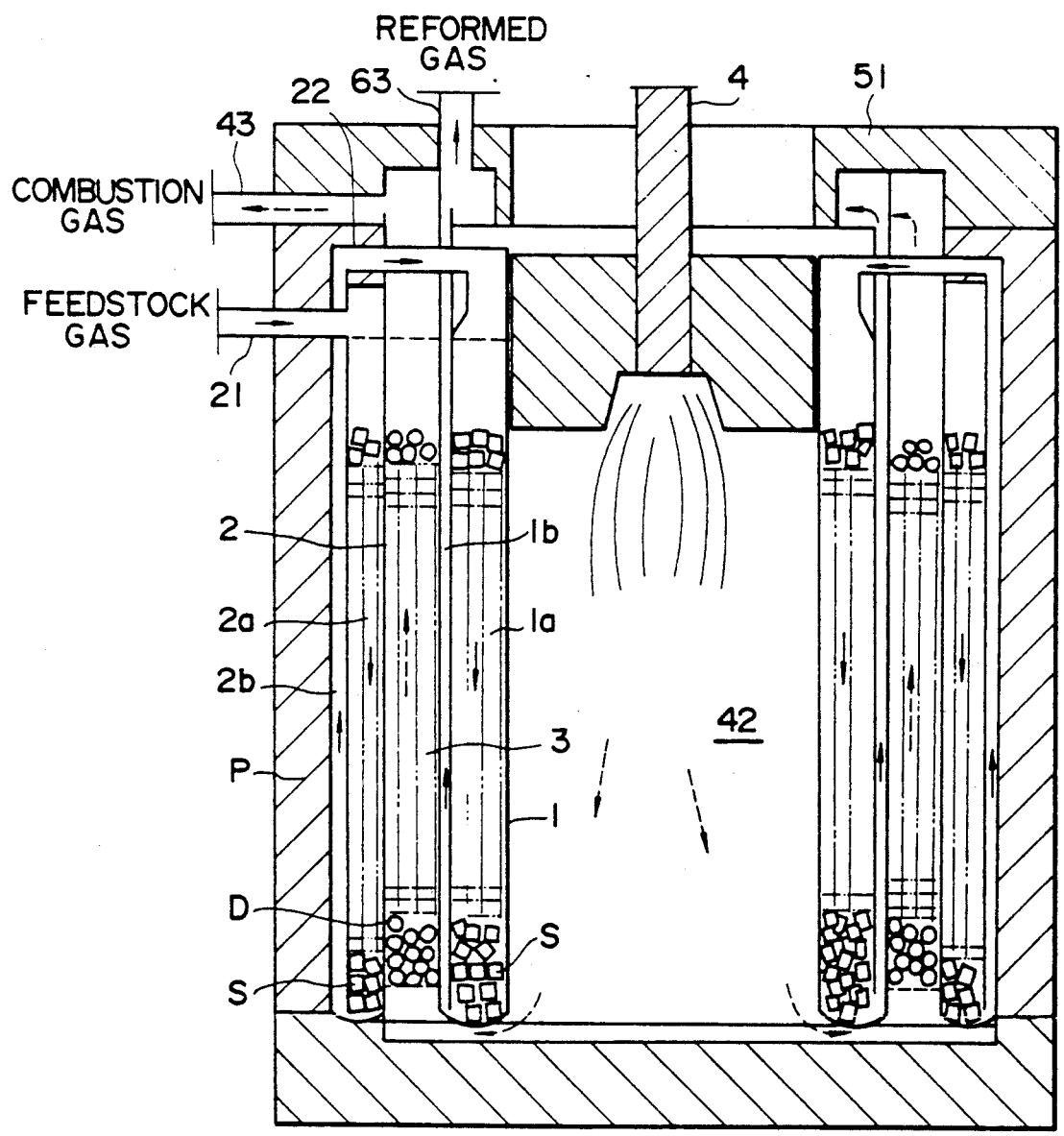

The third embodiment of the present invention is shown in cross-section in FIG. 5. This reforming apparatus is enclosed in the container formed by the insulation material (P). It has an inner reactor 1 (which is a cylindrical inner passage) and an outer reactor 2 (which is a cylindrical outer passage), which are arranged concentrically, with a cylindrical gap interposed between them. The cylindrical gas functions as the combustion gas discharge passage 3. The inner reactor 1 forms the central space which functions as the combustion gas passage 42. The combustion gas passage 42 communicates with the combustion gas discharge passage 3 at its lower end. In the upper part of the combustion gas passage 42 is the burner 4 which is supported downwardly by the cover 51. The inner reactor 1 and the outer reactor 2 are of double layered structure. The inside of the reactors 1 and 2 is divided into the feedstock gas downward passages 1a and 2a (which are of cylindrical shape) and the feedstock gas upward passages 1b and 2b (which are of cylindrical or tubular shape). They communicate with each other at their lower end. The feedstock gas downward passages 1a and 2a are filled with a nickel-alumina reforming catalyst (S). In the case of this embodiment, the feedstock gas downward passage 2a of the outer reactor 2 is connected to the feedstock gas intake passage 21 and the feedstock gas upward passage 1b of the inner reactor 1 is connected to the reformed discharge pipe 63. Moreover, the feedstock gas upward passage 2b of the outer reactor 2 and the feedstock gas downward passage 1a of the inner reactor 1 are connected to each other through the pipe 22. The waste combustion gas discharge passage 3 is filled with a heat transfer material such as alumina balls and Raschig rings D, and the upper end of the combustion gas discharge passage 3 is connected to the combustion gas exhaust pipe 43.

When the reforming apparatus of this example is in operation, the feedstock gas fed through the feedstock gas inlet pipe 21 flows downward through the feedstock gas downward passage 2a of the outer reactor 2 and flows upward through the upward passage 2a of the outer reactor 2 and then passes through the pipe 22 to enter the feedstock gas downward passage 1a of the inner reactor 1. It flows downward through the feedstock gas downward passage 1a and flows upward through the upward passage 1b. On the other hand, the combustion gas emerging from the burner 4 passes through the combustion gas passage 42, turns around the lower part of the inner reactor 1, flows upward through the combustion gas discharge passage 3, and leaves the combustion gas exhaust pipe 43. While the feedstock gas and the waste combustion gas flow as mentioned above, the heat of the waste combustion gas is transferred to the reactor.

In the reforming apparatus of this example, the combustion gas discharge passage is in contact with the outside of the inner reactor 1 and also with the inside of the outer reactor 2. Therefore, the heat transfer from the combustion gas discharge passage to the reactors 1 and 2 is performed efficiently. As a result, the catalyst layer is sufficiently heated and the feedstock gas undergoes the reforming reaction efficiently in the downward passages 1a and 2a filled with the catalyst (S). The feedstock gas is converted into a reformed gas composed mainly of hydrogen and carbon monoxide, and the reformed gas is discharged from the reformed gas outlet pipe 63. In addition, the combustion gas discharge passage 3 is surrounded by the outer reactor 2 and this prevents the hot combustion gas from coming into direct contact with the furnace casing. Therefore, the thickness of the insulation material (P) can be reduced.

In this embodiment, the heat transfer from the combustion gas passage 42 to the reactor is by radiation, whereas the heat transfer from the combustion gas discharge passage 3 to the reactor is mainly by conduction via the heat transfer material (D) filled into the combustion gas discharge passage 3. This greatly improves the efficiency of heat transfer from the combustion gas discharge passage 3. The heat transfer material varies the residence time of the combustion gas and the amount of heat transfer and hence controls the degree of heat exchange depending on its quantity and kind. This embodiment, which is of the countercurrent flow type, with the combustion gas and the feedstock gas flowing in opposite directions, performs efficient preheating of the feedstock gas which flows through the outer reactor 2.

Figure 6:
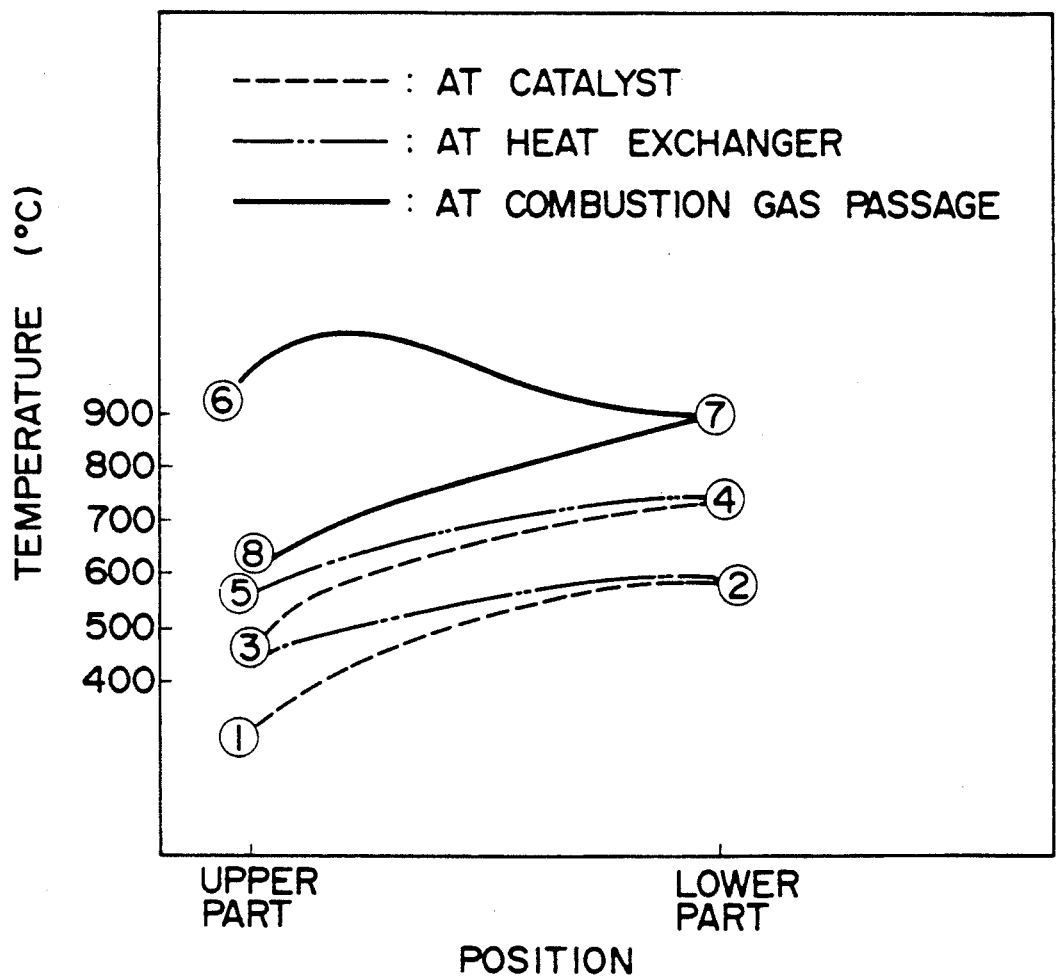
FIG. 6 is a graph showing the temperature distribution in the apparatus as shown in FIG. 5.

This example achieves the high efficiency of heat utilization as demonstrated by the graph FIG. 6 showing the temperature distribution of the feedstock gas in the reactor and on the surface of the reactor. Obviously, numerous modifications of the present inventions are possible in light of the above teachings. It is therefore to be understood that within the scope of the appended claims, the insertion may be practiced otherwise than as specifically described herein.

What is claimed is:

1. A hydrocarbon reforming apparatus comprising a furnace casing, an innermost central tube defining a combustion gas passage formed in the furnace casing, a cylindrical reaction section within the furnace casing which is made up of concentric cylindrical walls defining multilayered annular passages arranged concentrically and coaxially around the tube defining the combustion gas passage, with at least some of the multilayered passages being filled with catalysts, one of said multilayered passages not filled with catalyst defining a combustion gas discharge passage fluidly communicating with the tube defining the combustion gas passage, and another of said multilayered passages not filled with catalyst defining a feedstock gas intake passage fluidly communicating with at least one of the filled multilayered passages, wherein the multilayered passage defining the combustion gas discharge passage is located on the inside of either the outermost filled multilayered passage or the inside of the multilayered passage defining the feedstock gas intake passage, so that the combustion gas discharge passage is separated from the furnace casing.

2. A hydrocarbon reforming apparatus as claimed in claim 1, wherein the multilayered passage defining the feedstock gas intake passage is arranged on the periphery of the combustion gas discharge passage.

3. A hydrocarbon reforming apparatus as claimed in claim 2, wherein the multilayered passage defining the feedstock gas intake passage is a cylindrical passage arranged on the periphery of the combustion gas discharge passage.

4. A hydrocarbon reforming apparatus as claimed in claim 2, which is constructed such that the multilayered passage defining the feedstock gas flows through the feedstock gas intake passage in the direction parallel to that in which the combustion gas flows through the multilayered passage defining the combustion gas discharge passage.

5. A hydrocarbon reforming apparatus as claimed in claim 1, wherein the combustion gas discharge passage is arranged between adjacent catalyst-containing multilayered passages.

6. A hydrocarbon reforming apparatus as claimed in claim 1, wherein the catalyst filled multilayered passage contains two ore more catalysts with different catalyst activity, one having a lower activity than the other.

7. A hydrocarbon reforming apparatus as claimed in claim 6, wherein the multilayered passage contains two regions of lower-activity catalyst separated by a region of higher-activity catalyst.

8. A hydrocarbon reforming apparatus as claimed in claim 1, wherein is constructed such that the combustion gas flows through the multilayered passage defining the combustion gas passage in the direction parallel to that in which the feedstock gas flows through the innermost passage of the catalyst-filled multilayered passages.

9. A hydrocarbon reforming apparatus as claimed in claim 1, wherein the multilayered passage defining the combustion gas discharge passage is filled with an alumina-based insulation material.

10. A hydrocarbon reforming apparatus as claimed in claim 1, wherein is constructed such that combustion gas flows through the multilayered passage defining the combustion gas passage in the direction opposite to that in which the feedstock as flows through the innermost passage of the catalyst-filled multilayered passages, and further comprising means to cool reformed gas communicating with the outlet of the catalyst filled multilayered passage.

11. A hydrocarbon reforming apparatus as claimed in claim 1, which further comprises a means to generate a high-temperature gas installed at one end of the tube defining the combustion gas passage and arranged such that any high-temperature gas generated enters the combustion gas passage.

12. A hydrocarbon reforming apparatus as claimed in claim 1, which further comprises a solid-phase heat-insulation material arranged between the furnace casing and the reaction section.

13. A hydrocarbon reforming apparatus as claimed in claim 1 wherein said multilayered passage not filled with catalyst defining a feedstock gas intake passage fluidly communicates with the innermost filled multilayered passage.

14. A hydrocarbon reforming apparatus as claimed in claim 1 wherein said multilayered passage not filled with catalyst defining a feedstock gas intake passage fluidly communicates with the outermost filled multilayered passage.

* * * * *